United States Patent [19]

Cattermole

[11] 4,015,806
[45] Apr. 5, 1977

[54] TRIPOD ARRANGEMENTS

[75] Inventor: David Christopher Cattermole, Enfield, England

[73] Assignee: Elliott Brothers (London) Limited, Chelmsford, England

[22] Filed: Mar. 21, 1975

[21] Appl. No.: 560,603

[30] Foreign Application Priority Data

Mar. 26, 1974  United Kingdom ............ 13290/74

[52] U.S. Cl. ............................... 248/168; 248/163; 248/431; 248/188.2
[51] Int. Cl.² ........................................ F16M 11/38
[58] Field of Search .......... 248/163, 431, 168, 169, 248/188.2, 188.7, 20, 170, 171, 377, 396, 180, 181; 33/290, 292, 299

[56] References Cited

UNITED STATES PATENTS

| 821,335 | 5/1906 | Butler | 248/168 |
| 1,594,365 | 8/1926 | Havbroe | 248/168 |
| 2,282,285 | 5/1942 | Olson | 248/169 |
| 3,051,425 | 8/1962 | Homrighausen | 248/168 |
| 3,419,238 | 12/1968 | Flory | 248/163 |
| 3,632,073 | 1/1972 | Nakatani | 248/169 |

FOREIGN PATENTS OR APPLICATIONS 182,237  7/1922  United Kingdom ............... 248/169

*Primary Examiner*—Albert A. Hafer
*Attorney, Agent, or Firm*—Kirschstein, Kirschstein, Ottinger & Frank

[57] ABSTRACT

A double tripod arrangement in which the legs of a first tripod extend to a fixed angle and the feet of a second tripod are adjustably mounted on the legs of the first tripod. The first tripod forms a secure base on which the second tripod can be adjusted for height and for levelling.

6 Claims, 5 Drawing Figures

TRIPOD ARRANGEMENTS

The present invention relates to tripod arrangements.

According to one aspect of the present invention a tripod arrangement comprises a first tripod whose legs extend in use at a substantially fixed angle relative to one another and a second tripod adjustably supported upon the legs of said first tripod.

According to another aspect of the present invention a tripod arrangement comprises a first tripod whose legs extend in use at a substantially fixed angle relative to one another and a second tripod the lower ends of whose legs bear upon and are adjustable along a substantial part of the length of respective legs of the first tripod.

A tripod arrangement in accordance with the present invention will now be described by way of example with reference to the accompanying drawings, of which:

Figure 1:
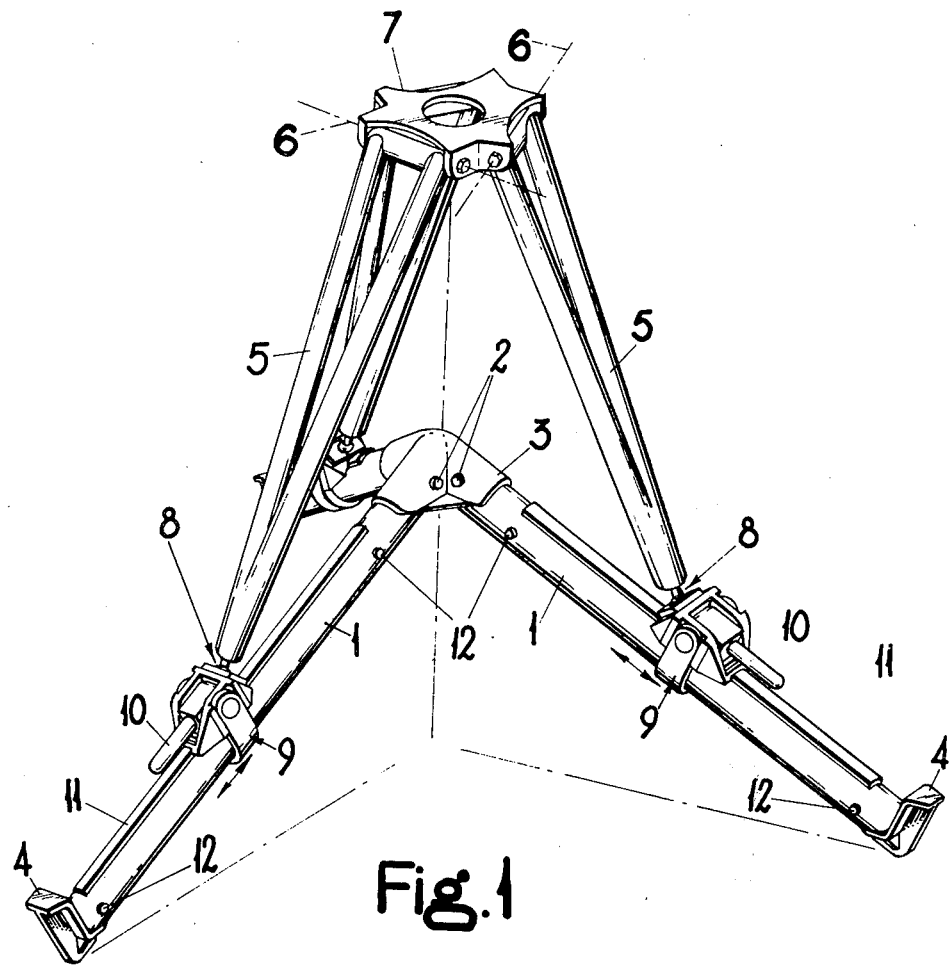
FIG. 1 shows a perspective view of the arrangement.

Referring first to FIG. 1 of the drawing the tripod arrangement comprises three lower legs 1 of generally tubular cross-section which are hinged on respective pins 2 to a common centre member 3, which member 3 is shaped so as to limit the spread of the legs 1 in the open position. The legs 1 are provided with feet 4 intended to resist sliding forces.

Three upper legs 5, which are freely pivoted about axes 6 to a mounting platform 7, are attached by ball joints 8 to collars 9 each of which is slidably adjustable along the major part of the length of the respective leg 1. The collars 9, which are locked in the desired position by respective camming levers 10 are prevented from rotating about the respective legs 1 by projecting guide plates 11 secured to the legs 1, for example by rivetting. Stops 12 are provided to limit the adjustment of the collars 9 along the legs 1. It is envisaged that other forms of guiding and locking means for the lower ends of the legs 5 may be used. An illuminated spherical bubble level may be provided on the mounting platform 7.

Figure 2:
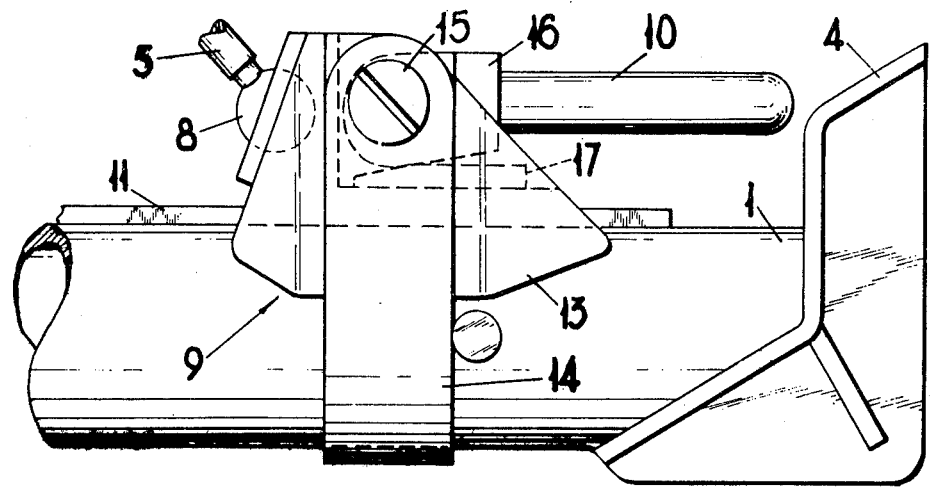
FIGS. 2 and 3 show respectively to a larger scale a side elevation and a sectional view of part of the arrangement of FIG. 1, FIGS. 4 and 5 show diagrammatically the tripod arrangement respectively on level and sloping ground.
Figure 3:
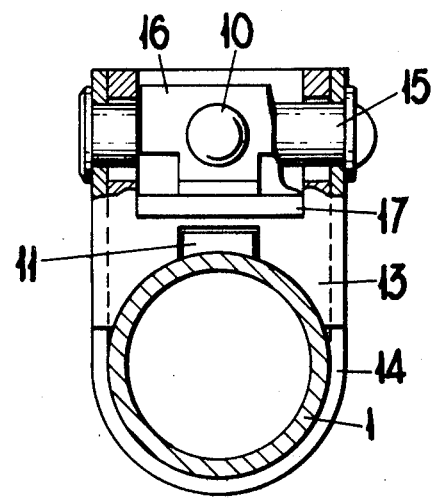

Referring now to FIGS. 2 and 3 the form of collar 9 shown in FIG. 1 comprises a generally saddle-shaped moulding 13 of, say, a formaldehyde-type polymer which is retained on the respective tripod leg 1 by a generally U-shaped strap 14 of stainless steel. A stainless steel pin 15 which extends between the arms of strap 14 carries a copper/aluminium alloy cam-block 16, from which the respective lever 10 extends, this cam-block 16 cooperating with a stainless steel plate 17 such that with the lever 10 in the position shown in FIG. 2 the moulding 13 and the strap 14 are clamped around the leg 1. When the lever 10 and the block 16 are rotated about the pin 15 so that the lever 10 extends generally at right-angles to the leg 1 the pressure exerted by the cam action between the block 16 and the plate 17 and hence between the strap 14 and the moulding 13 is released and the collar 9 as a whole is free to slide along the leg 1. The underside of the moulding 13 is recessed to accommodate the guide plate 11.

The legs 5 of the upper tripod each end in a stainless steel ball 18, which is retained in a hemispherical recess in the respective moulding 13 by an aluminium plate 19.

Figure 4:
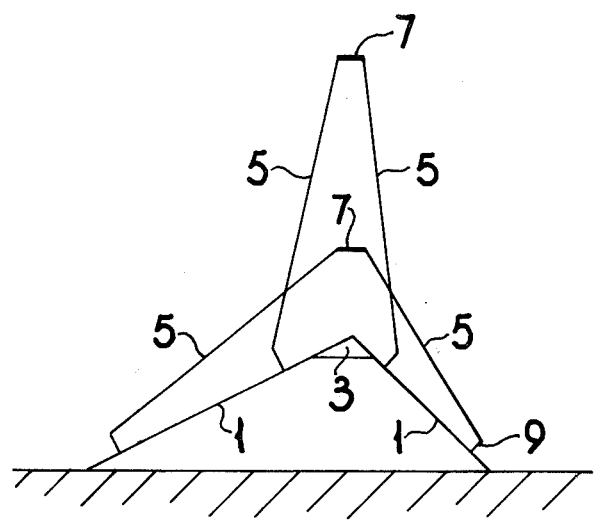
Figure 5:
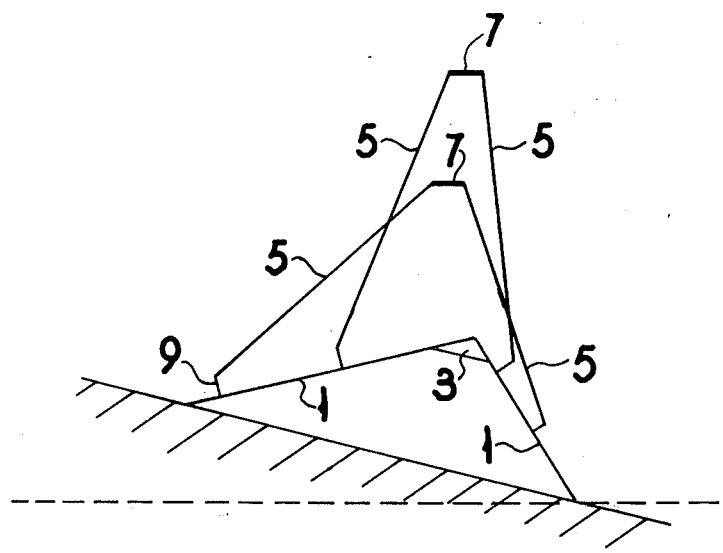

Referring now to FIGS. 4 and 5, it will be appreciated that for a considerable range of ground slope on which the feet 4 rest the collars 9 may be adjusted along the legs 1 to provide a level platform over a range of heights above ground. A particular example of such a tripod arrangement which in its folded condition measured some 24 inches long by 6 inches in diameter and which weighed 10 pounds, was adjustable in height over level ground, as indicated in FIG. 4, from 15 to 30 inches, and was designed to support loads of up to 150 pounds.

With the form of tripod arrangement described above the platform 7 can be levelled on ground slopes of up to one in one, although a more practical limit would be, say, the slope of one in four indicated in FIG. 5.

I claim:
1. A tripod arrangement comprising:
   I. a lower tripod including
      A. three legs,
      B. a center member,
      C. means freely pivotally connecting said legs to said center member,
      D. means on said center member to define a fully spread position for each of said three legs to which said legs are deployed in use, and
      E. feet at the lower ends of said legs for resting on the ground,
   II. an upper tripod including
      A. a platform,
      B. three legs, and
      C. means freely pivotally interconnecting said three legs of the upper tripod at their upper ends to said platform, and
   III. means releasably coupling the lower end of each of the legs of the upper tripod to bear upon and to be independently and separately adjustable along a substantial part of the length of a respective leg of the lower tripod,
   IV. each of said three upper legs being independently adjustable along the respective leg of the lower tripod while the other legs of the upper tripod are fixed to the respective legs of the lower tripod.

2. A tripod arrangement in accordance with claim 1 wherein the lower end of each of the legs of the upper tripod is attached to a respective collar which is slideable along the respective leg of the lower tripod and which includes means by which the collar may be clamped to said leg of the lower tripod.

3. A tripod arrangement in accordance with claim 1 wherein means is included to swiveledly connect the lower end of each leg of the upper tripod to the respective leg of the lower tripod.

4. A tripod arrangement in accordance with claim 2 wherein the legs of the first tripod are of generally circular section and are provided with longitudinally extending ribs which cooperate with the respective collars substantially to prevent rotation of said collars about the legs of the first tripod.

5. A tripod arrangement in accordance with claim 2 wherein each collar comprises a generally saddle-shaped moulding of plastics material and a generally U-shaped metal strap, together with cam and lever means acting between said moulding and said strap to clamp said collar about the respective leg of said first tripod.

6. An arrangement as set forth in claim 1 wherein the center member is connected solely to the three legs of the lower tripod and the platform is connected solely to the three legs of the upper tripod so that said platform is laterally displaced relative to said center member when the lower end of any leg of the upper tripod is shifted along the length of the respective leg of the lower tripod while the other legs of the upper tripod are fixed to the respective legs of the lower tripod.

* * * * *